United States Patent [19]

McDermott

[11] Patent Number: 4,668,935
[45] Date of Patent: May 26, 1987

[54] VISUAL ALARM RELIABILITY ASSURANCE SYSTEM

[76] Inventor: Julian A. McDermott, 1639 Stephen St., Ridgewood, N.Y. 11385

[21] Appl. No.: 785,208

[22] Filed: Oct. 7, 1985

Related U.S. Application Data

[63] Continuation-in-part of Ser. No. 430,937, Dec. 22, 1982, abandoned.

[51] Int. Cl.$^4$ ............................................. G09G 1/00
[52] U.S. Cl. ............................... 340/332; 340/825.06
[58] Field of Search ............ 340/508, 514, 521, 825.05, 340/825.06, 331, 332, 326, 641, 525; 324/418; 315/129, 136; 297/464; 169/60, 61, 11

[56] References Cited

U.S. PATENT DOCUMENTS 3,189,788  6/1965  Cady .
3,810,170  5/1974  Zinsmeister .
4,017,825  4/1977  Pichey .
4,199,754  4/1980  Johnson et al. .
4,222,047  9/1980  Finnegan .
4,449,073  5/1984  Mongoven et al. .

*Primary Examiner*—Ulysses Weldon
*Attorney, Agent, or Firm*—Eugene F. Osborne, Sr.

[57] ABSTRACT

A flashing visual alarm system for buildings and institutions, having occupants including persons having impaired hearing abilities, is provided with on-site continuous monitoring devices and provisions for periodic operational tests of the strobe or incandescent lamp assembly in each room by an inspector, plus a centralized supervisor's station for the entire building complex where the operating status of each alarm lamp is continually displayed for the maintenance of a reliable and fully operational emergency warning system.

11 Claims, 10 Drawing Figures

FIG.I

VISUAL ALARM RELIABILITY ASSURANCE SYSTEM

This is a continuation-in-part of application Ser. No. 430,937, filed Dec. 22, 1982 now abandoned.

BACKGROUND OF THE INVENTION (1) Field of the Invention

This invention relates to alarm and warning systems, but more specifically, it relates to apparatus for assuring the reliability of visual fire alarm and warning systems for buildings and institutions frequented by persons having impaired hearing ability.

(2) Description of Related Art

Visual alarm systems have been used to alert persons having impaired hearing capabilities, the alarm being given by the flashing of a lamp installed within a room or area occupied by such persons. In large institutional structures it is especially important that equipment and methods be provided to test the alarm circuits and components to assure their reliability without causing undue concern by hearing impaired occupants who may interpret a test as an authentic emergency.

Zinsmeister (U.S. Pat. No. 3,810,170) discloses a visual signaling system for deaf persons using a high intensity strobe lamp. Means for testing and assuring the reliability of the apparatus are not provided.

Pichey (U.S. Pat. No. 4,017,825) teaches a highway intersection warning system for alerting motorists to the proximity of emergency vehicles and suggests but does not develop circuitry for a strobe lamp. The disclosure does not teach a means for testing and assuring the reliability of the warning system.

Finnegan (U.S. Pat. No. 4,222,047) teaches a failure detection apparatus for incandescent lamps using a low level test signal that does not illuminate the lamp in question. The apparatus is not applicable to the testing of high voltage discharge triggered lamps.

Johnson (U.S. Pat. No. 4,199,754) discloses a fire detection and emergency system, operable with an incandescent lamp fixture, with auxiliary lighting for fire and power failure conditions wherein circuitry is provided to bypass the on-off switch of the general illumination lamp. The apparatus does not operate with a flashing alarm lamp.

Mongoven (U.S. Pat. No. 4,449,073) discloses an airport runway approach lighting system including strobe lamps and discharge current monitoring means of fault detection.

Cady (U.S. Pat. No. 3,189,788) discloses a battery operated circuit for the illumination of indicating lamps upon failure of AC line power.

It is common practice to test fire alarm circuits by sending a current through the circuit and monitor the current flow to activate warning devices if a deficiency in current flow appears. But strobe lamps are especially useful for alerting hearing impaired persons to emergencies, however, the reliability of a strobe lamp cannot be tested or monitored by means of a low lever continuous current. In institutional buildings it is not practical to frequently flash test the full complement of all the strobe lamps at once, because, being understood to represent a fire alarm, such testing could frighten the hearing impaired occupants or cause them to take unwanted action.

SUMMARY OF THE INVENTION

This invention provides means to assure reliability of a visual alarm system for institutional buildings and residences having hearing impaired occupants. Two procedures for assuring reliability where a number of units are in use are to monitor the current flowing into the wiring system up to the strobe lamp and to occasionally have an attending inspector operate, on-site, each strobe lamp. On-site and remote indications of system reliability are provided.

It is the principal object of this invention to provide improved visual alarm apparatus.

It is another object of this invention to provide more dependable visual alarm apparatus by continuous supervisory monitoring, by on-site displays and by on-site operational tests of the actual alarm lamp. Other objects, features and advantages will become apparent from the description in connection with the accompanying drawings of the presently preferred embodiments.

BRIEF DESCRIPTION OF THE DRAWINGS

The invention is described with reference to accompanying drawings, in which.

DESCRIPTION OF THE PREFERRED EMBODIMENTS

Figure 1:
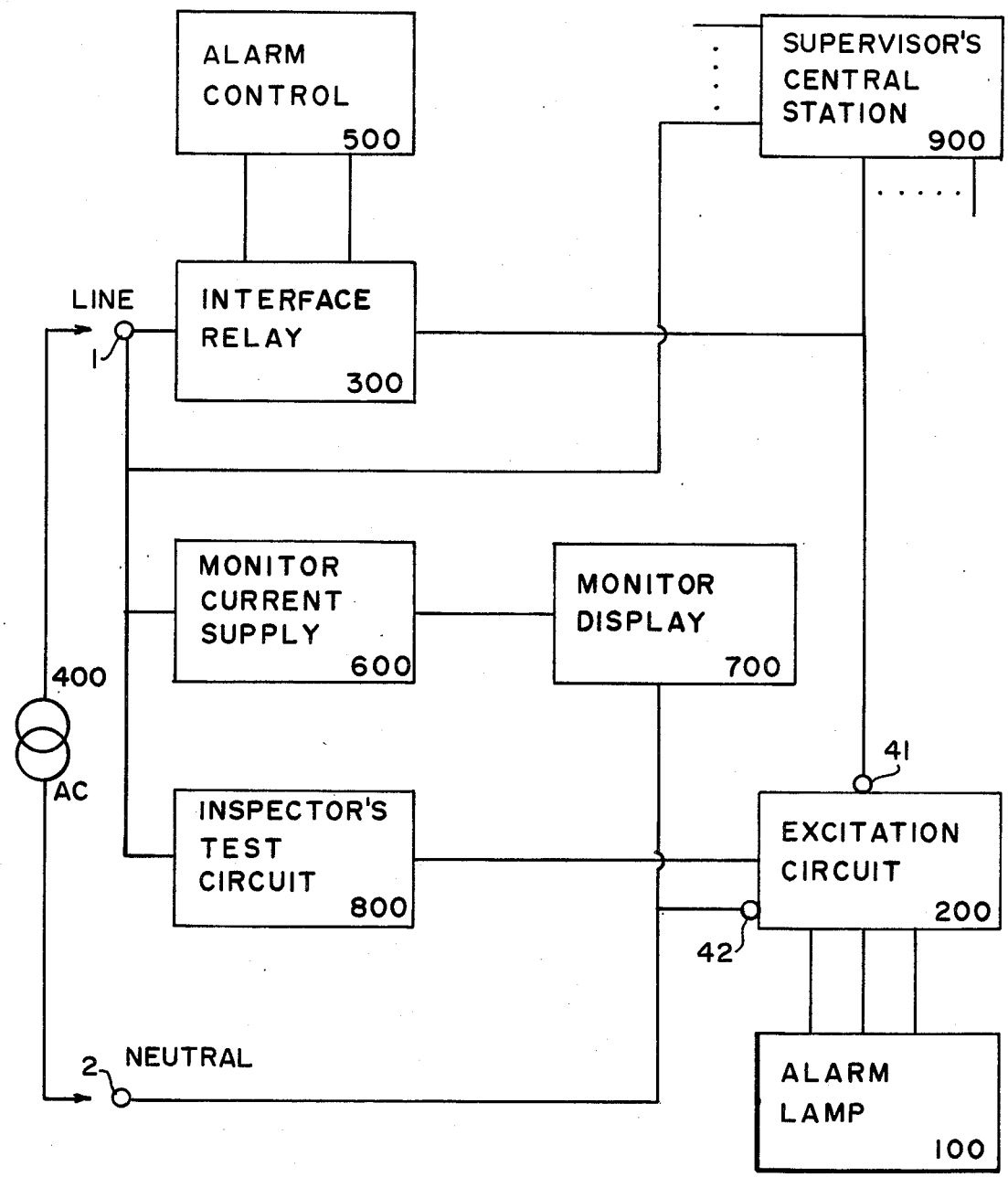
FIG. 1 is a block diagram of the apparatus for supervisory monitoring and for reliability assurance of a visual alarm system.

Referring now to FIG. 1 there is illustrated in block diagram form a status monitor and reliability assurance circuit for a visual alarm system according to the present invention. A visual alarm lamp 100 is operated in a flashing mode during emergencies by an excitation circuit 200 in response to control, by an alarm source 500, of an interface relay 300 which applies line power from an alternating current(AC) input supply 400. On-site monitoring of the integrity of the system wiring and the presence of AC line power up to the lamp excitation circuit 200 is by means of a monitor current supply network 600 and a local visual display 700 both of which operate continually while the interface relay 300 is normally deenergized. Periodic operating tests are performed onsite by an attending inspector, going from room-to-room, who informs the occupants of the area of the nature of the test should any occupants be present. Test circuit 800 is used to apply AC line voltage directly to the lamp excitation circuit 200 so as to flash the alarm lamp 100. The operating status of each alarm circuit in a multiple room(alarm) installation is continually monitored at a supervisor's central display 900.

FIGS. 2–5 illustrate preferred embodiments of the local on-site reliability assurance circuits wherein like components have the same numerical character designations. Terminals 1 and 2 are connected to the AC power line of which 2 is the neutral or grounded wire. The interface relay 3 is activated by the alarm control source 500(not shown in detail), which may be a fire alarm controller, smoke detector, or other like operating emergency controller. The local visual display(700 of FIG. 1) is a light emitting diode 4 in a circuit with a current limiting resistor 5, a rectifying diode 6, and a voltage protecting zener diode 7.

Figure 8:
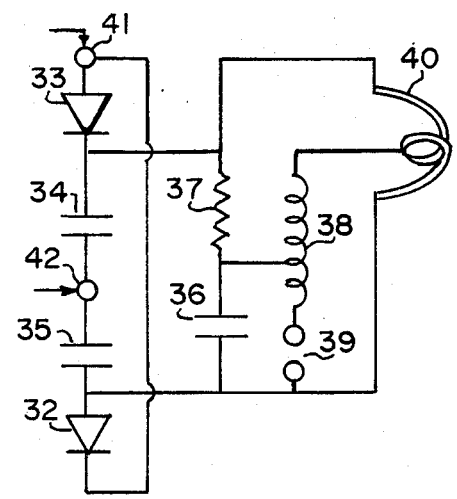
FIG. 8 is the conventional circuit for the excitation of a strobe lamp.

FIGS. 2–5 show a lamp assembly indicating a strobe lamp 40 with conventional excitation circuits 8, having input terminals 41 and 42 corresponding to AC input power line 1 and neutral 2 wiring respectively. FIG. 8 is a detailed electrical schematic of the strobe lamp assembly including the alarm lamp and its excitation circuit. FIG. 8 shows a voltage doubler circuit of rectifiers 32 and 33 and capacitors 34 and 35. The doubler provides direct current to the trigger capacitor 36 through a charging resistor 37. When the voltage across the trigger capacitor 36 rises high enough, a discharge occurs across unit 39 which may be a neon lamp or equivalent solid state device, or an air(spark) gap. The autotransformer 38 reacts to the discharge at unit 39, causing a high voltage pulse into the strobe lamp 40 which in turn releases the stored energies(charges) of capacitors 34 and 35 through the lamp to fire the strobe 40 giving a flash of high intensity illumination. With continued application of AC power the process repeats. If for any reason the AC voltage at lamp terminals 41 and 42 is inadequate the capaictor 36 will fail to discharge through the air gap 39 and the strobe will not fire. Reliability requires that adequate voltages be delivered through the wiring and circuits to the strobe lamp 40.

In some situations, as for example in rooms of an institution where the occupants are always awake and alert, it may be permissible to use an incandescent lamp 43 driven by a convential flasher unit 46 and full wave zener diodes 44 and 45 constituting an excitation circuit connected to terminals 41 and 42. The ratings of the zenners 44 and 45 are selected so that the lamp 43 cannot operate below a voltage threshold at terminals 41 and 42. Below this threshold the status circuits of FIGS. 6 and 7 and the reliability on-site monitors of FIGS. 2–5 are operable.

Figure 2:
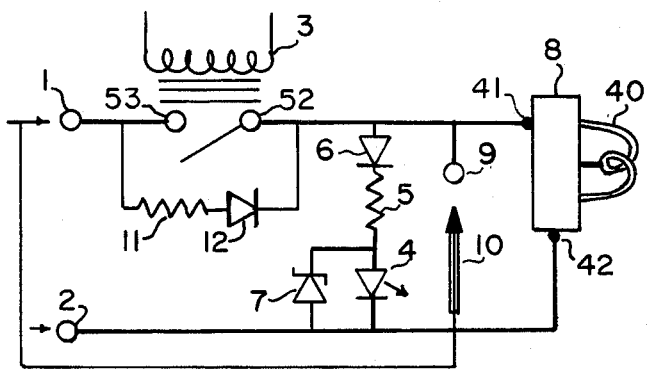
FIG. 2 is a first circuit schematic of an on-site reliability assurance system for a visual alarm system.
Figure 3:
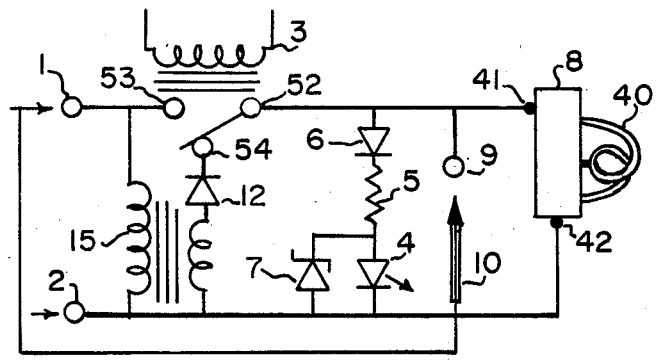
FIG. 3 is a second circuit schematic of an on-site reliability assurance system.
Figure 4:
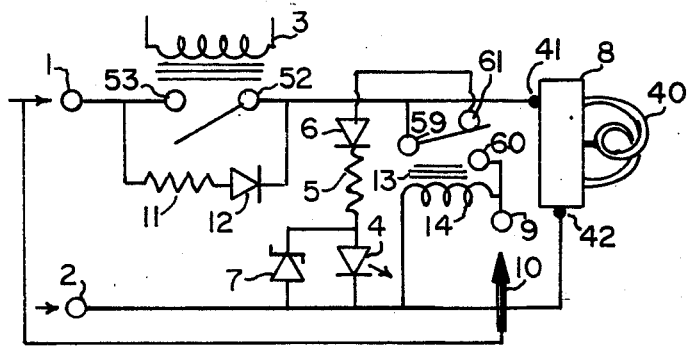
FIG. 4 is a third circuit schematic of an on-site reliability assurance system.
Figure 5:
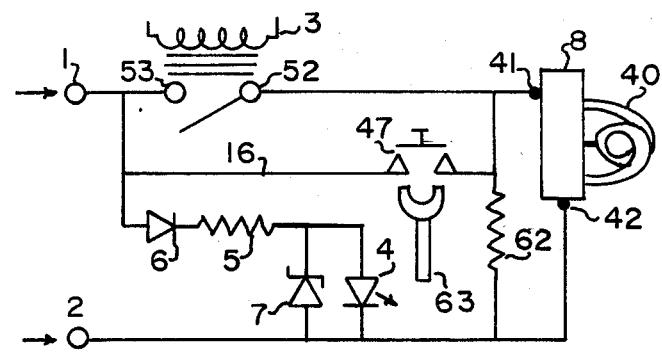
FIG. 5 is a fourth circuit schematic of an on-site reliability assurance system.

Returning to FIGS. 2–5, means are provided whereby a monitoring current is obtained by circuits bypassing the normally open contacts 52 and 53 of the interface relay 3. In FIGS. 2 and 4 a small current is obtained by the series network of a limiting resistor 11 and a rectifying diode 12 arranged in shunt across the normally open contacts 52 and 53. In FIG. 3 the monitoring current is obtained by use of a step-down voltage transformer 15. The transformer has a primary winding connected across the AC input terminals 1 and 2 and a secondary winding connected from the neutral bus 2-42 through a rectifying diode 12 and the normally closed contacts 52 and 54 of the interface relay 3. In FIG. 5 the monitoring current is obtained by a direct connection to the AC input line terminal 1, the value of the limiting resistor 5 being adjusted for the full line voltage.

In FIGS. 2–5 a means for an attending inspector, going from room-to-room in the building, to excite and perform a full on-side test of each alarm lamp, be it a strobe 40 or an incandescent lamp 43, requires a method and means of bypassing the interface relay 3 with full AC line voltage. As shown in FIGS. 2–4 each lamp fixture may have at its surface an accessible terminal 9 for making electrical contact thereto. The inspector is provided with a portable polarized(conductive) extension cord and probe with mating terminal 10(for reaching fixtures at ceiling heights). The inspector inserts the cord 10 in a convenient AC room outlet an applies AC line voltage effectively from terminal 1 to terminal 41 of the excitation circuit. In lieu of the inspector's electrical probe 10, a conductor may be hard wire in the fixture from terminal 1, bypassing the interface relay contacts 52 and 53 to a protected inspector's switch 47, momentarily operable by a key or a portable magnetic probe 63 to apply the AC line voltage to the excitation terminal 41(see FIG. 5). The protected switch is desired to preclude unauthorized operation of the alarm lamp circuits. In FIG. 5 a high resistance 62 shunting terminals 41 and 42 provides a path for current flow to enable the operation of the status sensing circuits of FIGS. 6 and 7.

In the circuit of FIG. 4, a monitor relay 13 has its coil 14 connected from the neutral bus 2-42 to the test terminal 9. Normally closed contacts 59 and 61 permit the flow of monitor current from the bypass network resistor 11 and diode 12 through the monitor display network and its light emitting diode(elements 4,5,6 and 7). To test fire the alarm lamp the inspector applies line voltage at terminal 9, activating the monitor relay 13 so as to apply line voltage effectively from terminal 1 through normally open contacts 59 and 60 to the excitation terminal 41. The operation of the relay 13 disconnects the monitor visual display network, elements 4–7, from the controlled line bus 52-41 thereby avoiding voltage transients to the elements due to inspector's testing.

Figure 6:
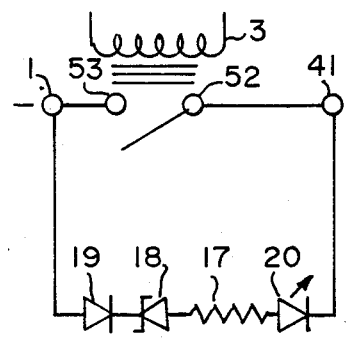
FIG. 6 is a first circuit schematic for a monitoring apparatus for remote indication of system status and reliability.
Figure 7:
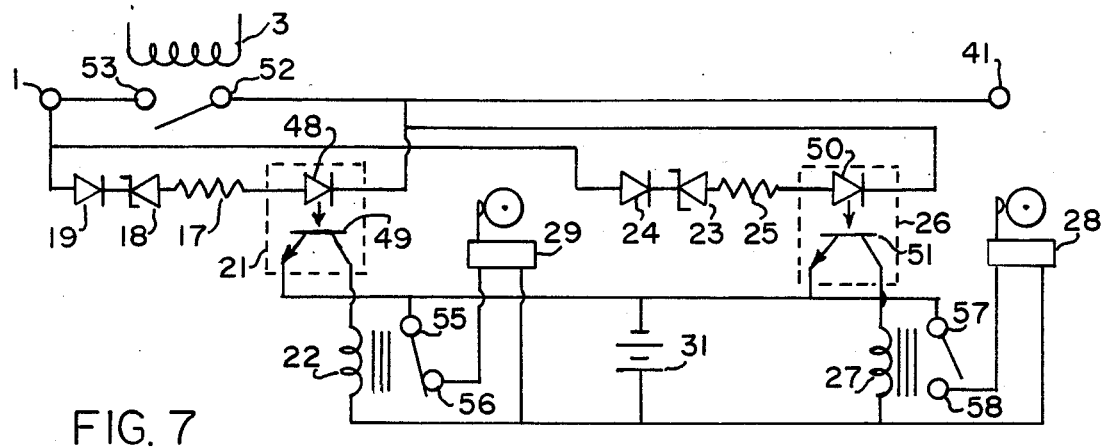
FIG. 7 is a second circuit schematic for a monitoring apparatus for remote indication of system status and reliability.

In a multiple room building or institution status indication at a central or remote supervisor's station is sueful for coordination of repairs of malfunctions or prompt actions in response to an actual emergency such as a fire. FIGS. 6 and 7 illustrate circuits for supervisory monitoring. In FIG. 6 the status monitor is a series network of a light emitting diode 20, a resistor 17, a zener diode 18 and a rectifying diode 19. In a preferred embodiment the network bridges the normally open contacts 52 and 53 of the interface relay 3, with at least the light emitting diode 20 located remotely at the supervisor's station display. Failure of the diode to emit light will indicate one of three conditions. A momentary failure to emit light indicates that the maintenance inspector has just tested, on-site, the operation of the alarm lamp in the specific room. A prolonged failure to emit light indicates either an open circuit with absence of AC line power or a closure of the interface relay 3 in response to a fire condition, both being events that require the immediate attention and action of the supervisor.

Figure 9:
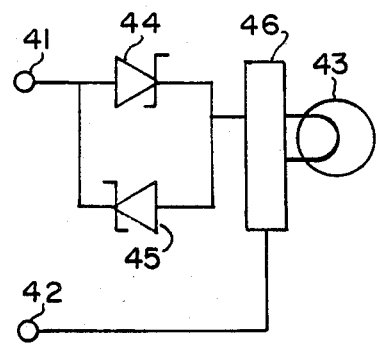
FIG. 9 is an excitation circuit of a flashing incandescent alarm lamp for use in a reliability assurance system.

The function of the status sensor is expanded in the circuits shown in FIG. 7 to indicate short circuits in the alarm fixture and to provide audible warnings at the remote central station of the supervisor. Two status sensing networks are provided both bridging the normally open contacts 52 and 53 of the interface relay 3. In the first status sensing network, a diode 19, resistance 17, and zener 18 diode are arranged in series with each other and with a light emitting diode that is constructed as a subelement of a component called an "opto" 21. The light emitting diode 48 subelement is optically coupled with a photo transistor subelement 49. The photo transistor 49 controls power from a battery 31, or equivalent power supply, and activates the auxiliary relay 22. Under normal conditions the current through the opto 21 will keep the relay 22 energized thereby opening the contact 55 and 56 preventing the bell, lamp or other alarm 29 located at the supervisor's central station from operating. Again as described for the status network of FIG. 6, momentary failure of the opto 21 to conduct thereby ringing the bell or other alarm 29 at the supervisor's station indicates an on-site inspector's test of the alarm lamp operation. Prolonged failure and bell ringing indicates either a fire condition or open circuit failure of the fixture or system, both being conditions requiring urgent action. Similarily, the second status sensing network has elements including a zener diode 23, a rectifying diode 24, a resistor 25 and an opto 26 containing light emitting diode 50 and optically coupled photo transistor 51 subelements for control of a second auxiliary relay 27 having normally open contacts 57 and 58 for connection of battery 31 power to a supervisor's bell or other alarm device 28. In the event of a short circuit or excessive leakage within the alarm lamp 40 or 43 or the lamp excitation circuits shown in FIGS. 8 and 9 the voltage across the series network of elements 23–26 will rise above the established zener 23 threshold causing the opto 26 to conduct and energize relay 27 so as to activate the supervisor's alarm 28. To maintain reliability of the alarm system the supervisor is required to respond with corrective action on indication of a shorted circuit in the local alarm system. Each supervisor's alarm device 28 and 29 may provide visual as well as audio indications for aiding in rapid determination of the source of the emergency or malfunction.

Figure 10:
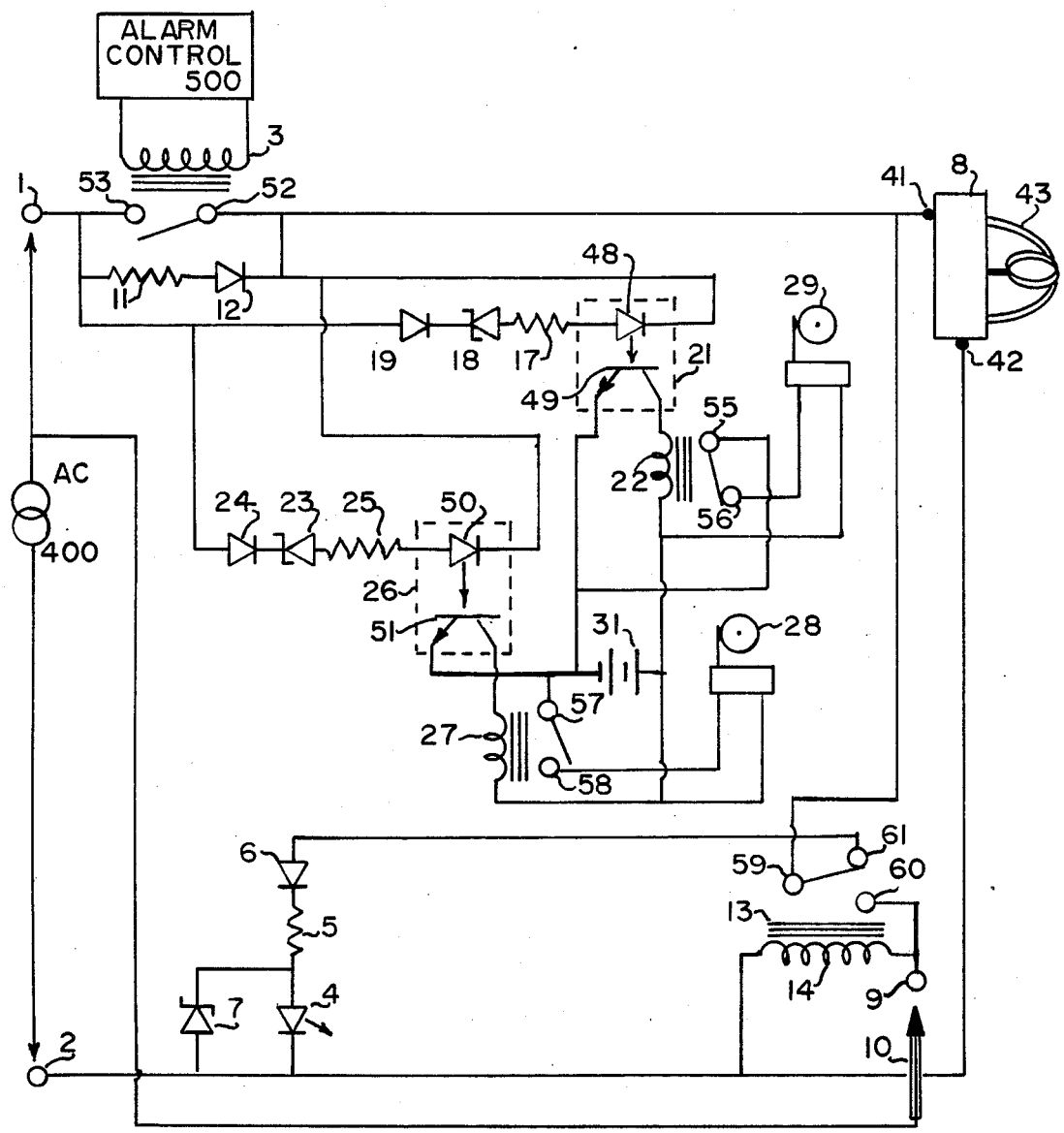
FIG. 10 is an illustrative schematic of an integrated status monitor and reliability assurance system according to the block diagram of FIG. 1.

The supervisory status indicating networks of FIGS. 6 and 7 are compatible additions to any one of the on-site reliability monitors, FIGS. 2 through 5. The wiring connections are made at terminals 1 and 41 or their equivalents such as interface relay contacts 52 and 53. For example, FIG. 10 illustrates a fully integrated status monitor and reliability assurance apparatus for visual alarm system. In FIG. 10 the supervisory status monitor of FIG. 7 has been merged with the on-site reliability monitor of FIG. 2. Without further illustrations it is readily apparent that the preferred embodiments include combinations of the elements and functions of FIGS. 2 through 9.

From the foregoing disclosure of the improvements of this invention it is apparent that operational status can be indicated for supervisory control, and reliability of the visual alarm apparatus can be assured by responding to the indications of routine on-site monitoring and testing. Variations and modifications of the herein described embodiments are within the scope of the present invention. Accordingly the foregoing description should be taken as illustrative and not in a limiting sense.

Having described the invention, I claim:

1. An apparatus for operational status monitoring and reliability assurance of a visual alarm system having fixtures containing alarm lamps, operable in a flashing mode, distributed in the rooms of a building or institution for alerting and warning occupants of said rooms, wherein the improvement comprises:

(a) a source of alternating current (AC) power available through a pair of wires to input line and neutral terminals of said apparatus;

(b) an interface relay, responsive to an external control source that detects an emergency condition and requires activation of an alarm, having a normally open switch for on-off application of full AC line voltage, an input contact of said switch connected to said line terminal and an output contact thereof connected to an input terminal of a lamp excitation circuit;

(c) said excitation circuit for said alarm lamp, responsive to said application of full line voltage, having means therein whereby said alarm lamp is operated in said flashing mode and having further means for discriminating against monitor voltages applied at voltage levels below a threshold required for operation of said alarm lamp at its rated intensity of flashing illumination;

(d) a means, connected between said line terminal and a monitor display for supplying a current for on-site monitoring when said interface relay is deenergized in the absence of said emergency conditions;

(e) said monitor display on-site at said alarm lamp fixture, responsive to said monitor current, comprising:

a light emitting diode for visual indication of the presence of said AC power at said line and neutral terminals; and a zener diode arranged in parallel for voltage protection of said light emitting diode; and a series network comprising:

a rectifying diode; and a current limiting resistor;

said parallel and series networks connected in series from said excitation circuit input terminal to said neutral terminal with the polarity of said light emitting and rectifying diodes arranged for current flow; and (f) a means whereby an attending inspector may periodically perform an operational test of said alarm lamp by bypassing said interface relay normally open switch for on-off application of full line voltage to said excitation circuit.

2. An apparatus as recited in claim 1, wherein the improvement further comprises:

(a) an interface connection of a pair of conducting wires bridging a pair of normally open circuit contacts of said interface relay that control the application of said AC line voltage to said excitation circuit input terminal of said alarm lamp fixture, said pair of conducting wires extending to a centralized remote location of a supervisory monitoring station; and (b) an indicating sensor subsystem at said remote location, bridging said interface connection, being responsive to operating status and conditions affecting reliability of said visual alarm system, so as to alert attending supervisory personnel responsible for managing said building or institution.

3. An apparatus as recited in claim 1 wherein said means for supplying on-site monitoring current comprises a series arrangement of:

(a) a current limiting resistor; and (b) a rectifying diode, said series arrangement connected from said input line terminal to a junction between said monitor display and the line terminal of said lamp excitation circuit.

4. An apparatus as recited in claim 1, wherein said means for supplying on-site monitoring current comprises:
   (a) a resistor;
   (b) a rectifying diode; and
   (c) a pair of normally closed contacts of a monitor relay arranged whereby said resistor and said rectifying diode in series connect from said input line terminal to said input terminal of said excitation circuit and said normally closed monitor relay contacts connect from said excitation input terminal to said monitor display.

5. An appratus as recited in claim 1, wherein said means for supplying on-site monitoring current comprises:
   a direct wiring connection between said input line terminal and said monitor display.

6. An apparatus as recited in claim 1, wherein said means whereby an attending inspector may periodically perform an operational test of said alarm lamp, comprises:
   (a) an accessible electrical contact terminal at the surface of said alarm lamp fixture connecting to a line terminal of said excitation circuit; and
   (b) a portable electrical probe and polarized extension cord assembly with a mating contactor, for use by said attending inspector in momentarily connecting said line voltage from a convenient room outlet of said source of AC power to said accessible contact terminal.

7. An apparatus as recited in claim 1, wherein said means whereby an attending inspector may periodically perform an operational test of said alarm lamp comprises:
   (a) an accessible electrical contact terminal at the surface of said alarm lamp fixture;
   (b) a monitor relay having a coil connected between said accessible contact terminal and a neutral bus connecting to said neutral input terminal;
   (c) a wiring connection from said accessible contact terminal through said pair of normally open contacts of said monitor relay to said lamp excitation circuit input terminal; and
   (d) a portable electrical probe and polarized extension cord assembly with a mating contactor, for use by said attending inspector in momentarily connecting said AC line voltage from a convenient room outlet of said source of AC power to said accessible contact terminal.

8. An apparatus as recited in claim 2, wherein said indicating sensor subsystem comprises a series network of:
   (a) a current limiting resistor;
   (b) a rectifying diode;
   (c) a light emitting diode, connected with the same polarity as said rectifying diode; and
   (d) a zener diode, connected with its polarity arranged to provide voltage protection for said light emitting diode;
whereby said light emitting diode provides a visible display for supervisory monitoring of said AC power at said alarm lamp input, open circuit malfunctions, inspector's operational tests, and emergency events that exercise said interface relay to activate said visual alarm lamp.

9. An apparatus as recited in claim 2, wherein said indicating sensor subsystem comprises:
   (a) a first subcircuit, for supervisory monitoring said AC line voltage at said excitation circuit input terminal, open circuit malfunctions, inspector's operational tests, and emergency events that exercise said interface relay to activate said visual alarm lamp, comprising:
      a rectifying diode connected to one of said pair of interface wires;
      a zener diode connected in series with said rectifying diode;
      current limiting resistor connected in series with said zener diode;
      a light emitting diode subelement of an opto connected in series with said current limiting resistor and to the second of said pair of interface wires, and connected further by optical coupling to a photo transistor subelement of said opto,
      said photo transistor connected further to control current flow through a first auxiliary relay and battery supply, responsive to presence of said AC line voltage at said alarm lamp fixture;
      said first auxiliary relay having normally closed contacts connected in series with said battery supply and a supervisor's means for indicating status conditions, said normally closed contacts being held open in response to said presence of said AC line voltage; and
      said battery supplying power to said phototransistor subelement, said first auxiliary relay and said supervisor's means for indicating status conditions; and
   (b) a second subcircuit, for supervisory monitoring short circuits and excess leakage currents in said excitation circuit and said alarm lamp fixture, comprising:
      a rectifying diode connected to one of said pair of interface wires;
      a zener diode connected in series with said rectifying diode;
      a current limiting resistor connected in series with said zener diode;
      a light emitting diode subelement of an opto connected in series with said current limiting resistor and to the second of said pair of interface wires, and connected further by optical coupling to a phototransistor subelement of said opto;
      said photo transistor subelement connected further to control current flow through a second auxiliary relay and said battery supply, responsive to an increase in voltages in said second subcircuit due to said short circuit or excessive leakage conditions;
      said second auxiliary relay having normally open contacts connected in series with said battery supply and a supervisor's means for indicating status conditions, said normally open contacts being closed in response to a short circuit or excess current leakage conditions; and
      said battery supplying power to said phototransistor subelement, said second auxiliary relay and said supervisor's means for indicating status conditions.

10. An apparatus as recited in claim 1, wherein said alarm lamp, operable in a flashing mode in response to said application of full line voltage to said excitation circuit, is a strobe lamp.

11. A visual alarm system, adapted for at least one of the separate rooms of a building or institution for alerting persons of impaired hearing ability to an existing emergency condition, wherein the improvement comprises:
  (a) a source of AC power made available in at least one room of said building or institution.
  (b) a visual alarm assembly for each said room, comprising:
    line and neutral terminals for connection to said source of AC power;
    an interface relay, responsive to an external source of alarm control, for application of full line voltage of said AC power, through a line voltage control switch, of said relay, having an input contact thereof connected to said line terminal and an output contact thereof connected to an input terminal of a lamp excitation circuit;
    said excitation circuit responsive to said application of full line voltage for developing repetitive high voltage pulses of energy;
    a strobe lamp, responsive to said repetitive pulses of energy, for emitting high intensity flashes of illumination;
    a means for supplying a low level current from said AC power;
    a visual monitor display, responsive to said low level current, for indicating integrity of said AC power source and continuity of the system wiring;
    a means for bypassing said interface relay control switch for a periodic test, by an attending inspector, of the operability of said excitation circuit and said strobe lamp through application of said line voltage to said excitation circuit;
    a means of interfacing said line voltage control switch of said interface relay to an external location; and
  (c) a two wire conductor, a first wire thereof connected to a junction of said line terminal and an input contact of said line control switch, and a second wire thereof connected to a junction of an output contact of said line control switch and an input terminal of said excitation circuit for transmitting the prevailing conditions of said line voltage control switch of said interface relay to a centralized remote location; and
  (d) a supervisory monitoring station at said centralized remote location, comprising for each visual alarm lamp:
    a first subcircuit, terminating said two wire conductor, and having means for sensing and displaying an indication of an open circuit and absence of said AC power at said alarm lamp, momentary testing by said inspector of said lamp, and closure of said interface relay by said source of alarm control; and
    a second subcircuit, connected in parallel with said first subcircuit, and having means for sensing and displaying an indication of a short circuit or an excessive leakage current condition in said excitation circuit or alarm lamp.

* * * * *